(12) United States Patent
Inoue

(10) Patent No.: US 12,195,147 B2
(45) Date of Patent: Jan. 14, 2025

(54) POSITION LOCATING SYSTEM, MARINE VESSEL, AND TRAILER FOR MARINE VESSEL

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizioka (JP)

( * ) Notice: Subject to any disclaimer, the term of this patent is extended or adjusted under 35 U.S.C. 154(b) by 192 days.

(21) Appl. No.: 17/875,493

(22) Filed: Jul. 28, 2022

(65) Prior Publication Data
US 2023/0042962 A1  Feb. 9, 2023

(30) Foreign Application Priority Data
Aug. 4, 2021 (JP) ................................. 2021-128132

(51) Int. Cl.
*G01S 19/24* (2010.01)
*B63B 49/00* (2006.01)

(52) U.S. Cl.
CPC ............ *B63B 49/00* (2013.01); *G01S 19/243* (2013.01)

(58) Field of Classification Search
CPC .......... G01S 19/40; G01S 19/41; G01S 19/42; G01S 19/51; G01S 19/243; B60P 3/1075; G05D 1/0206; B63B 49/00
USPC ......................................................... 701/21
See application file for complete search history.

(56) References Cited

U.S. PATENT DOCUMENTS

| 5,430,654 | A | * | 7/1995 | Kyrtsos | G01S 19/41 |
| | | | | | 701/470 |
| 5,731,788 | A | * | 3/1998 | Reeds | G01S 19/19 |
| | | | | | 342/357.57 |
| 5,781,150 | A | * | 7/1998 | Norris | G01C 21/20 |
| | | | | | 342/357.34 |
| 6,061,632 | A | * | 5/2000 | Dreier | G01S 19/44 |
| | | | | | 701/470 |
| 6,067,046 | A | * | 5/2000 | Nichols | G01S 19/41 |
| | | | | | 342/357.31 |
| 6,140,957 | A | * | 10/2000 | Wilson | G01C 15/00 |
| | | | | | 701/411 |

(Continued)

FOREIGN PATENT DOCUMENTS

WO  2016/163559 A1  10/2016

*Primary Examiner* — Logan M Kraft
*Assistant Examiner* — Joshua Campbell
(74) *Attorney, Agent, or Firm* — Keating & Bennett, LLP

(57) ABSTRACT

A position locating system to determine relative position information between a marine vessel and a trailer includes a first GNSS receiver located on one of a marine vessel and a trailer to receive a positioning signal from a positioning satellite, a second GNSS receiver located on the other of the marine vessel and the trailer to receive the positioning signal from the positioning satellite, a registering unit to register a current position of the trailer based on the positioning signal received by the first GNSS receiver when the trailer is stationary, a direction obtaining unit to obtain a direction of the marine vessel, a generating unit to generate correction information in real time based on the current position and the positioning signal received from the positioning satellite by the first GNSS receiver, and a position locator to determine relative position information between the marine vessel and the trailer.

11 Claims, 7 Drawing Sheets

(56) References Cited

U.S. PATENT DOCUMENTS

| | | | | |
|---|---|---|---|---|
| 6,236,356 B1* | 5/2001 | Hayashi | ............ | G01S 19/51 |
| | | | | 342/357.34 |
| 6,314,366 B1* | 11/2001 | Farmakis | ............ | G08G 1/205 |
| | | | | 340/961 |
| 6,397,147 B1* | 5/2002 | Whitehead | ............ | G01S 19/41 |
| | | | | 701/472 |
| 6,414,629 B1* | 7/2002 | Curcio | ............ | G08B 21/0492 |
| | | | | 342/357.52 |
| 7,561,886 B1* | 7/2009 | Gonring | ............ | G01C 3/08 |
| | | | | 340/514 |
| 8,442,710 B2* | 5/2013 | Glaeser | ............ | B63B 43/18 |
| | | | | 701/470 |
| 9,904,293 B1* | 2/2018 | Heap | ............ | G05D 1/12 |
| 2004/0222902 A1* | 11/2004 | Wortsmith | ............ | B63B 49/00 |
| | | | | 340/686.2 |
| 2009/0121932 A1* | 5/2009 | Whitehead | ............ | G01S 19/53 |
| | | | | 342/357.36 |
| 2012/0072059 A1* | 3/2012 | Glaeser | ............ | G08G 3/00 |
| | | | | 701/21 |
| 2013/0110329 A1* | 5/2013 | Kinoshita | ............ | G05D 1/0206 |
| | | | | 367/107 |
| 2018/0023958 A1* | 1/2018 | Takahashi | ............ | G01C 21/28 |
| | | | | 701/477 |
| 2018/0050772 A1* | 2/2018 | Koyano | ............ | B63H 21/21 |
| 2019/0129426 A1* | 5/2019 | Garcia | ............ | B62D 15/0285 |
| 2019/0302774 A1* | 10/2019 | Akuzawa | ............ | G05D 1/0206 |
| 2020/0148317 A1* | 5/2020 | Epskamp | ............ | G01B 11/22 |

* cited by examiner

FIG. 6
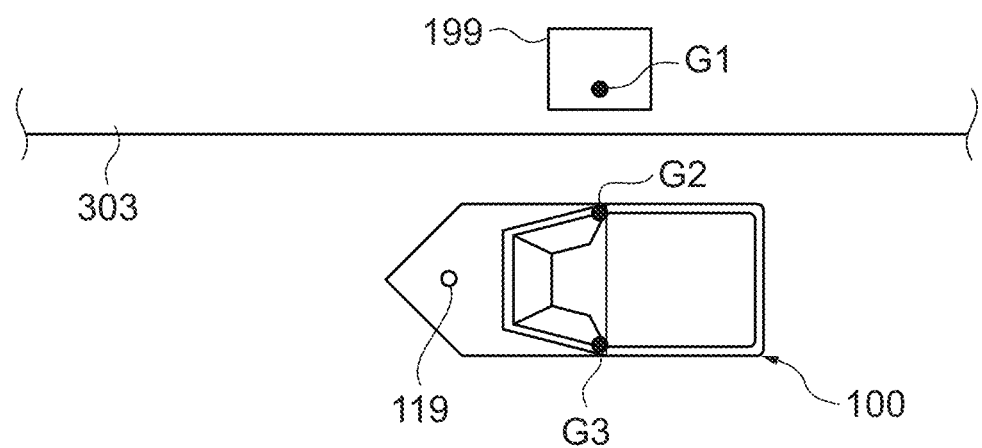
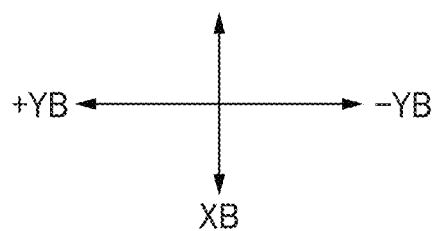

POSITION LOCATING SYSTEM, MARINE VESSEL, AND TRAILER FOR MARINE VESSEL

CROSS REFERENCE TO RELATED APPLICATIONS

This application claims the benefit of priority to Japanese Patent Application No. 2021-128132, filed on Aug. 4, 2021. The entire contents of this application are hereby incorporated herein by reference.

BACKGROUND OF THE INVENTION

1. Field of the Invention

The present invention relates to a position locating system, a marine vessel, and a trailer for a marine vessel that locate a relative position between objects.

2. Description of the Related Art

Mainly in order to smoothly perform landing of a small marine vessel and departure of the small marine vessel from the water surface, a technique that locates relative position information between a trailer and the marine vessel is known. International Publication No. WO 2016/163559 discloses a technique that obtains position information of a trailer and controls a propulsion device to perform detachment and attachment of a hull.

In the technique disclosed in International Publication No. WO 2016/163559, a plurality of transmitters is disposed on the trailer, a receiving unit is disposed on the hull, a distance between the trailer and the hull is obtained based on the strength of a signal received by the receiving unit, and the direction of the hull with respect to the trailer is obtained based on the direction of the signal. In addition, in the technique disclosed in International Publication No. WO 2016/163559, a camera such as a stereo camera, an infrared camera, or a TOF (Time of Flight) camera is disposed on the hull, and the above distance and the direction of the hull are obtained based on three-dimensional images picked up by the camera.

However, since there are few specifications mounted on the camera disclosed in International Publication No. WO 2016/163559, it is desired to propose a position locating method other than the method disclosed in International Publication No. WO 2016/163559 as an option.

SUMMARY OF THE INVENTION

Preferred embodiments of the present invention provide position locating systems, marine vessels, and trailers for marine vessels that are each able to determine relative position information between the marine vessels and the trailers with high accuracy.

According to a preferred embodiment of the present invention, a position locating system includes a first GNSS receiver located on a first object that is one of a marine vessel and a trailer for the marine vessel and is configured or programmed to receive a positioning signal from a positioning satellite; a second GNSS receiver located on a second object that is the other of the marine vessel and the trailer and is configured or programmed to receive the positioning signal from the positioning satellite; a controller configured or programmed to function as a registering unit to register a current position of the first object based on the positioning signal received from the positioning satellite by the first GNSS receiver in a state that the first object is stationary, a direction obtaining unit to obtain a direction of the second object, and a generating unit to generate correction information in real time based on the current position registered by the registering unit, and the positioning signal received from the positioning satellite by the first GNSS receiver; and a position locator configured or programmed to determine relative position information between the marine vessel and the trailer based on the direction of the second object obtained by the direction obtaining unit, the correction information generated by the generating unit, and the positioning signal received from the positioning satellite by the second GNSS receiver at a time coincident to receiving the positioning signal by the first GNSS receiver.

According to another preferred embodiment of the present invention, a marine vessel, which is the first object or the second object in the position locating system, includes at least one of the registering unit, the direction obtaining unit, the generating unit, or the position locator of the position locating system.

According to another preferred embodiment of the present invention, a trailer for a marine vessel, which is the first object or the second object in the position locating system, includes at least one of the registering unit, the direction obtaining unit, the generating unit, or the position locator of the position locating system.

According to preferred embodiments of the present invention, the current position of the first object is registered based on the positioning signal received from the positioning satellite by the first GNSS receiver in the state that the first object is stationary. The correction information is generated in real time based on the registered current position and the positioning signal received from the positioning satellite by the first GNSS receiver. Based on the direction of the second object obtained, the generated correction information, and the positioning signal received from the positioning satellite by the second GNSS receiver at the time coincident to receiving the positioning signal by the first GNSS receiver, the relative position information between the marine vessel and the trailer is determined. As a result, it is possible to determine the relative position information between the marine vessel and the trailer with high accuracy.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a schematic view of a position locating system according to a first modification example.

DETAILED DESCRIPTION OF THE PREFERRED EMBODIMENTS

Hereinafter, preferred embodiments of the present invention will be described with reference to the drawings.

Figure 1:
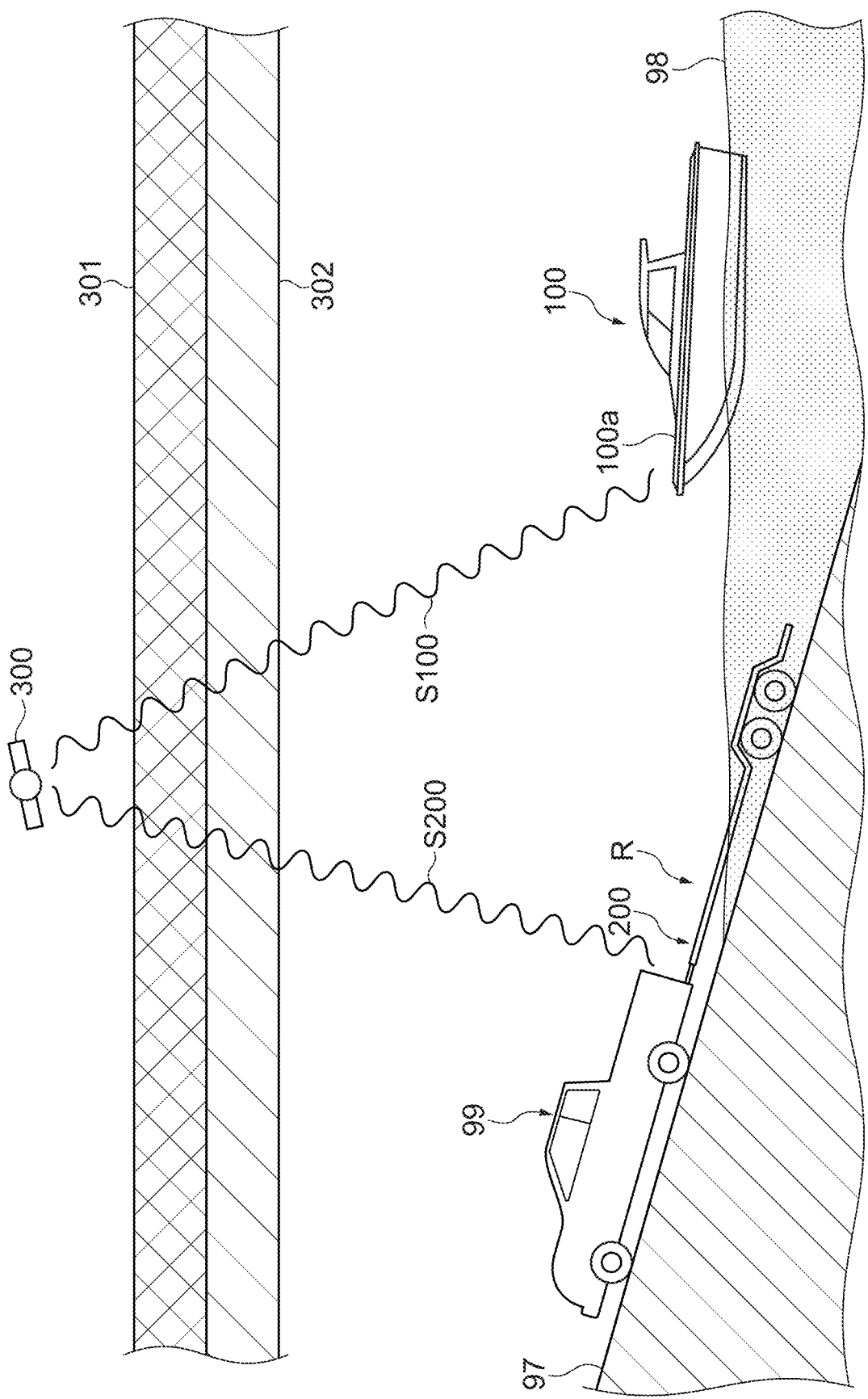
FIG. 1 is a side view that shows an example of a trailering system to which a position locating system according to a preferred embodiment of the present invention is applied.
Figure 2:
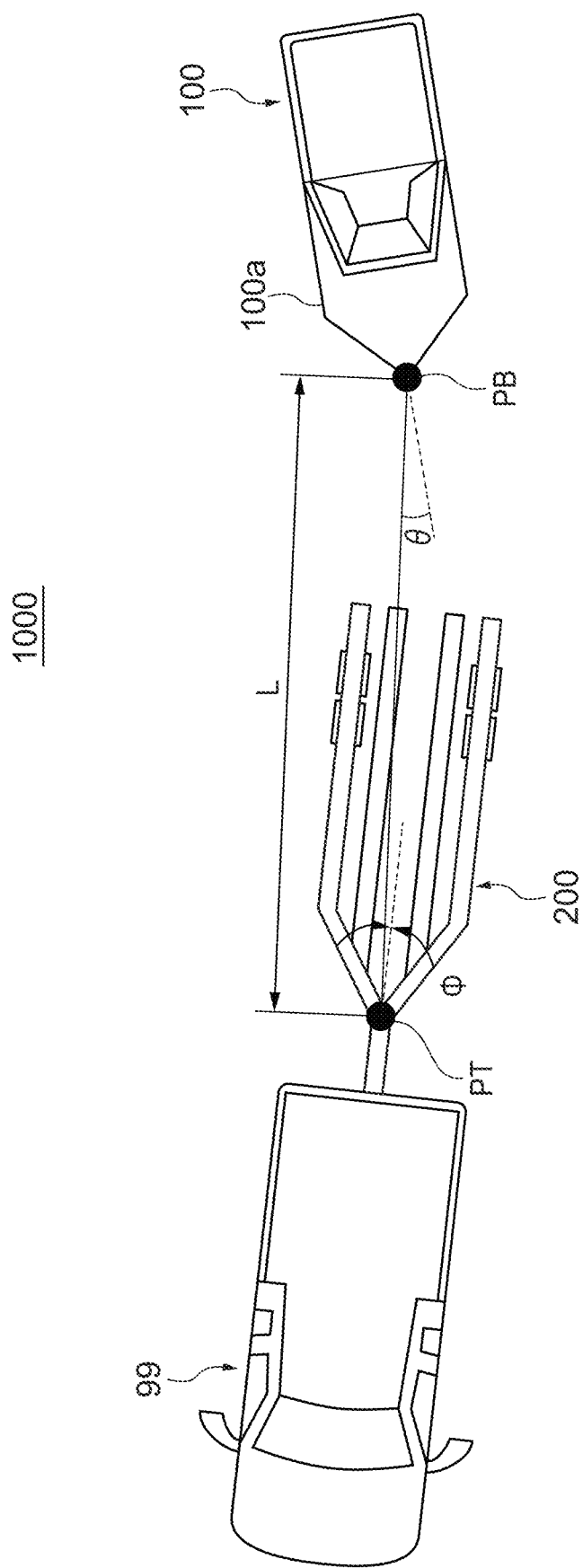
FIG. 2 is a top view that shows an example of the trailering system.

FIG. 1 is a side view that shows an example of a trailering system to which a position locating system according to a preferred embodiment of the present invention is applied. FIG. 2 is a top view that shows an example of the trailering system. A trailering system 1000 includes a marine vessel 100 and a trailer 200 that loads the marine vessel 100. The trailer 200 is towed by a vehicle 99 operated by a driver. The marine vessel 100 is, for example, a so-called jet boat.

The trailering system 1000 allows not only the marine vessel 100 to be detached from the trailer 200 and but also the marine vessel 100 to be attached to the trailer 200. An inclined portion (a ramp) R that inclines downward toward the bottom of the water is provided at the water's edge. When moving the marine vessel 100 from the trailer 200 on land 97 to a water surface 98, that is, when the marine vessel 100 is detached from the trailer 200 on land 97 (at the time of detachment), as shown in FIG. 1, the driver drives the vehicle 99 to move the trailer 200 to the inclined portion R. When switching to an automatic trailing mode, the marine vessel 100 automatically moves in a direction away from the trailer 200. As a result, detachment work of detaching the marine vessel 100 from the trailer 200 is automatically performed.

Further, when moving the marine vessel 100 from the water surface 98 to the trailer 200 on land 97, that is, when the marine vessel 100 is attached to the trailer 200 on land 97 (at the time of attachment), first, the driver moves the trailer 200 to the inclined portion R. When switching to the automatic trailing mode, the marine vessel 100 is automatically maneuvered and moves in a direction toward the trailer 200. As a result, attachment work of attaching the marine vessel 100 to the trailer 200 is automatically performed. Specific work of automatic detachment and automatic attachment are achieved by a publicly known method such as the method disclosed in International Publication No. WO 2016/163559.

It should be noted that it is efficient to automatically perform the attachment work described above after a control unit 101 functioning as a position locator locates "relative position information" between the marine vessel 100 and the trailer 200. Further, it is not essential that the marine vessel 100 is automatically detached from or attached to the trailer 200.

Here, the "relative position information" is defined as quantities when viewed from above as shown in FIG. 2, and includes a distance L, a relative marine vessel direction φ, and a relative trailer direction θ. It is assumed that reference positions necessary to define the relative position information are a reference position PT on the trailer 200 and a reference position PB on the marine vessel 100. The reference position PT may be any portion of the trailer 200 (any position on the trailer 200), and the reference position PB may be any portion of the marine vessel 100 (any position on the marine vessel 100).

The distance L is a distance between the trailer 200 (a first object) and the marine vessel 100 (a second object). That is, the distance L is a linear distance between the reference position PT and the reference position PB. The relative marine vessel direction φ is a relative direction (an orientation) of the marine vessel 100 as viewed from the trailer 200. The relative trailer direction θ is a relative direction (an orientation) of the trailer 200 as viewed from the marine vessel 100.

Figure 3:
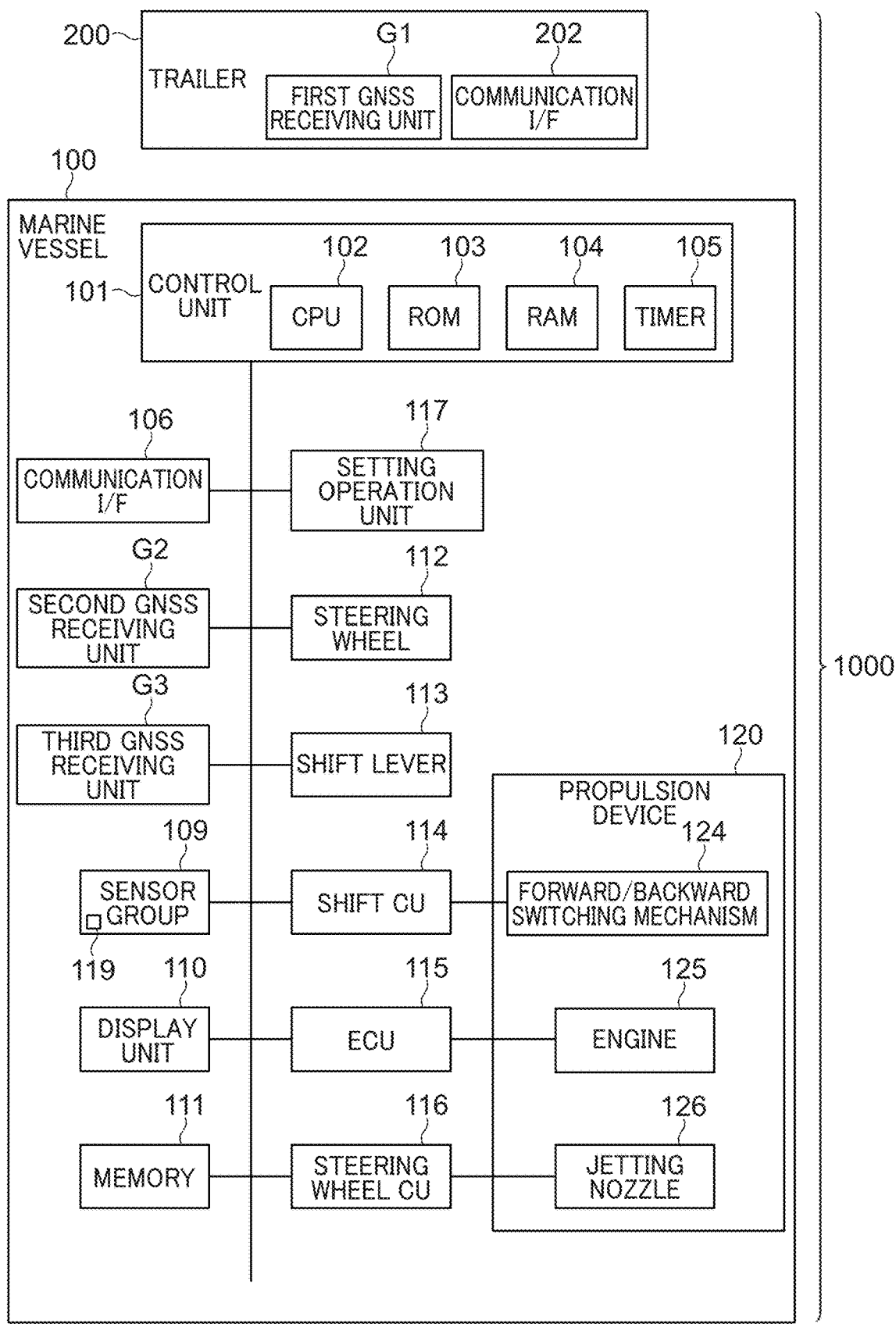
FIG. 3 is a block diagram of the trailering system.

FIG. 3 is a block diagram of the trailering system 1000. The position locating system according to a preferred embodiment of the present invention includes the control unit 101, a first GNSS (Global Navigation Satellite System) receiving unit G1, a second GNSS receiving unit G2, and a direction sensor 119.

The marine vessel 100 includes a hull 100a (see FIGS. 1 and 2) and a propulsion device 120 on the hull 100a. The marine vessel 100 obtains a propulsive force by ejecting a jet flow of water with the propulsion device 120.

The propulsion device 120 includes an engine 125 that generates a drive force, a forward/backward switching mechanism 124 that transmits the drive force generated by the engine 125 in an adjusted state, and a jetting nozzle 126 that ejects the jet flow of water. In addition, the marine vessel 100 includes an impeller (not shown) to which the drive force generated by the engine 125 is transmitted via the forward/backward switching mechanism 124. The propulsion device 120 generates the jet flow from the jetting nozzle 126 by rotating the impeller by the drive force. Further, the marine vessel 100 adjusts a traveling direction of the marine vessel 100 by changing an ejecting direction of the jet flow from the jetting nozzle 126 generated by the rotation of the impeller.

The marine vessel 100 includes the control unit 101, an ECU (Engine Control Unit) 115, a shift CU (Control Unit) 114, and a steering wheel CU 116. The control unit 101 controls the entire marine vessel 100 including the propulsion device 120. The control unit 101 includes a CPU (Central Processing Unit) 102, a ROM (Read Only Memory) 103, a RAM (Random Access Memory) 104, and a timer 105. The ROM 103 stores control programs. The CPU 102 executes various kinds of control processes by expanding the control programs, which are stored in the ROM 103, on the RAM 104 and executing them. The RAM 104 provides a working area for the CPU 102 to execute the control programs.

The ECU 115, the shift CU 114, and the steering wheel CU 116 control the engine 125, the forward/backward switching mechanism 124, and the jetting nozzle 126, respectively, based on instructions from the control unit 101.

The marine vessel 100 includes a sensor group 109. In addition to the direction sensor 119, the sensor group 109 includes a tidal current sensor, a wind speed sensor, a hook sensor, a water landing sensor, an acceleration sensor, a speed sensor, and an angular speed sensor (none of which are shown). The hook sensor detects that a hook of the trailer 200 is hung on the hull 100a. The water landing sensor detects that the jetting nozzle 126 of the propulsion device 120 is located in the water. The acceleration sensor detects an attitude of the hull 100a by detecting an inclination of the hull 100a in addition to detecting an acceleration of the hull 100a. The speed sensor and the angular speed sensor detect a speed (a hull speed) and an angular speed of the hull 100a, respectively. The direction sensor 119 will be described below with reference to FIG. 4.

The hull 100a of the marine vessel 100 is provided with a steering wheel 112 and a shift lever 113. The control unit 101 controls the ejecting direction of the jet flow ejected from the jetting nozzle 126 via the steering wheel CU 116 based on a rotation angle of the steering wheel 112. Further, the control unit 101 performs a control to change the forward/backward switching mechanism 124 via the shift CU 114 based on a position of the operated shift lever 113.

The marine vessel 100 includes a memory 111, a display unit 110, a setting operation unit 117, a communication I/F (interface) 106, the second GNSS receiving unit G2, and a third GNSS receiving unit G3. The memory 111 includes a non-volatile storage medium. The display unit 110 includes a display and displays various kinds of information based on the instructions from the control unit 101. The setting operation unit 117 includes an operation piece that performs operations related to marine vessel maneuvering, a setting operation piece that performs various kinds of settings, and an input operation piece that inputs various kinds of instructions (none of which are shown).

The communication I/F 106 communicates wirelessly or by wire with an external apparatus. The second GNSS receiving unit G2 and the third GNSS receiving unit G3 receive a GNSS signal from a GNSS satellite 300 (see FIG. 1), which is a positioning satellite. The second GNSS receiving unit G2 and the third GNSS receiving unit G3 will be described with reference to FIGS. 4 and 5. The signals received by the second GNSS receiving unit G2 and the third GNSS receiving unit G3 are supplied to the control unit 101.

The trailer 200 includes the first GNSS receiving unit G1 and a communication I/F 202. The first GNSS receiving unit G1 receives the GNSS signal from the GNSS satellite 300. The communication I/F 202 communicates wirelessly or by wire with the external apparatus. The communication I/F 202 also communicates with the communication I/F 106. It should be noted that a communication method between the marine vessel 100 and the trailer 200 does not matter.

Figure 4:
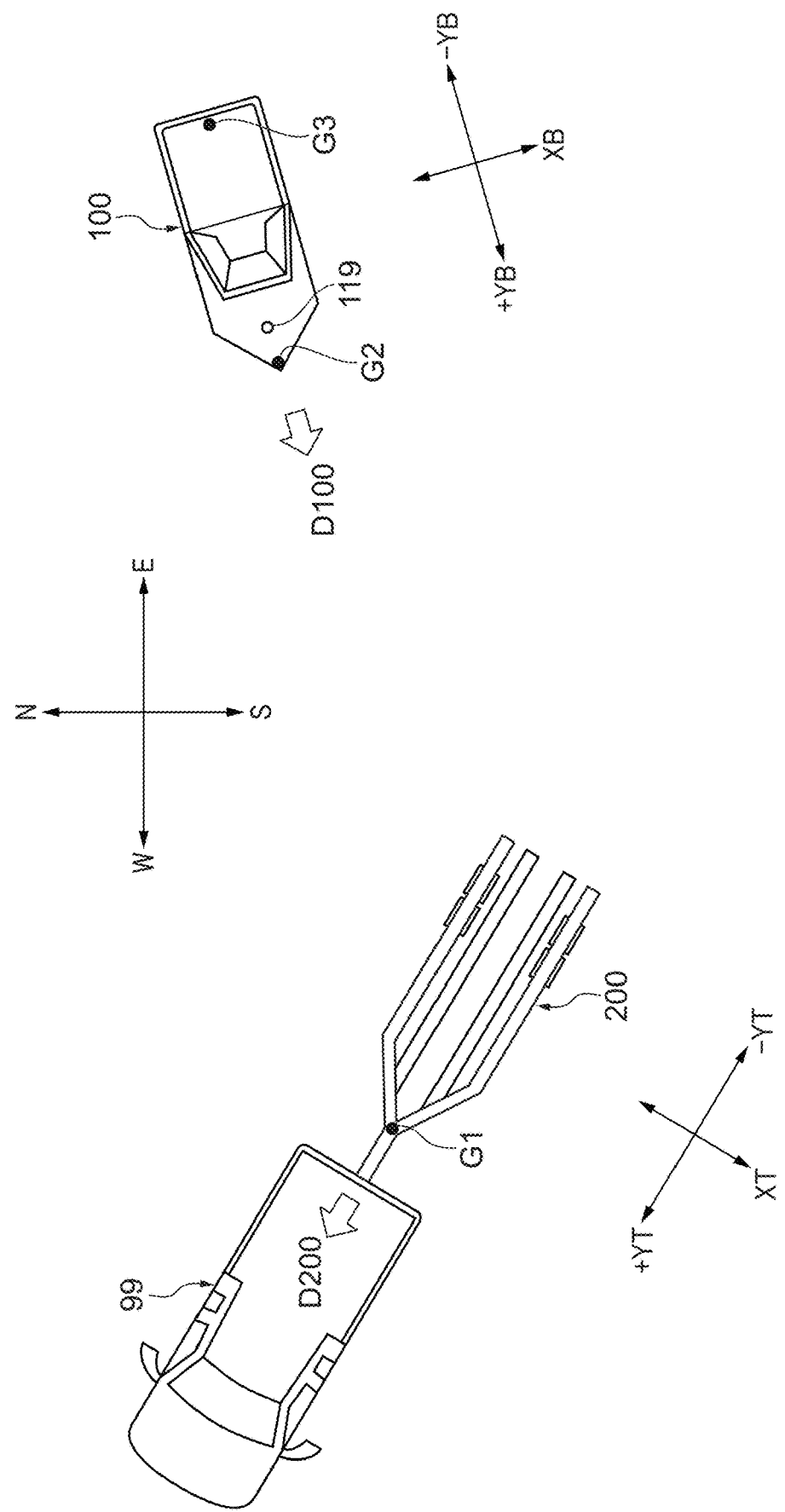
FIG. 4 is a schematic top view of the trailering system.

The direction sensor 119, the first GNSS receiving unit G1, the second GNSS receiving unit G2, and the third GNSS receiving unit G3 according to a preferred embodiment of the present invention will be described. FIG. 4 is a schematic top view of the trailering system 1000.

Directions are defined for convenience based on a case that the trailer 200 is on a horizontal plane. A longitudinal direction of the trailer 200 is set as a YT direction, more specifically, the front direction is set as a +YT direction and the rear direction is set as a −YT direction. The YT direction corresponds to a detachment and attachment direction of the marine vessel 100. Further, a crosswise direction of the trailer 200 is set as an XT direction. A front-to-rear direction of the marine vessel 100 is set as a YB direction, especially the front direction is set as a +YB direction and the rear direction is set as a −YB direction. Further, a crosswise direction of the marine vessel 100 is set as an XB direction.

As shown in FIG. 4, the second GNSS receiving unit G2 is located on the bow of the marine vessel 100, and the third GNSS receiving unit G3 is located on the stern of the marine vessel 100. The relative positional relationship between the second GNSS receiving unit G2 and the third GNSS receiving unit G3 is known. It should be noted that the arrangement relationship of the second GNSS receiving unit G2 and the third GNSS receiving unit G3 can be reversed. Further, the arrangement position of the direction sensor 119 on the marine vessel 100 does not matter. As an example, the arrangement position of the second GNSS receiving unit G2 on the marine vessel 100 is set to the reference position PB (see FIG. 2). On the other hand, the arrangement position of the first GNSS receiving unit G1 on the trailer 200 is set to the reference position PT (see FIG. 2).

As shown in FIG. 4, the direction of the marine vessel 100 is set as an absolute marine vessel direction D100, and the direction of the trailer 200 is set as an absolute trailer direction D200. The absolute marine vessel direction D100 and the absolute trailer direction D200 are angles (azimuth angles) within a horizontal plane with north (N) as 0°, clockwise 90° for east (E), 180° for south (S), and 270° for west (W).

As an example, the direction sensor 119 includes a 3-axis magnetometer. The 3-axis magnetometer outputs the absolute marine vessel direction D100 of the marine vessel 100 by detecting the terrestrial magnetism. The CPU 102 obtains the absolute marine vessel direction D100. It should be noted that the direction sensor 119 may be another type of sensor capable of detecting the direction.

The control unit 101 locates the relative position information by using an RTK (Real Time Kinematic) positioning method, for example. All of the first GNSS receiving unit G1, the second GNSS receiving unit G2, and the third GNSS receiving unit G3 receive the positioning signal transmitted from the GNSS satellite 300 (see FIG. 1). It should be noted that there are usually four or more GNSS satellites 300 to be targets of signal reception by the first GNSS receiving unit G1, the second GNSS receiving unit G2, and the third GNSS receiving unit G3. The first GNSS receiving unit G1, the second GNSS receiving unit G2, and the third GNSS receiving unit G3 receive the positioning signal in real time, that is, receive the positioning signal at the same time zone and at coincident times.

As shown in FIG. 1, since the positioning signal is delayed by passing through an ionosphere 301, a troposphere 302, etc., when the signal reception is performed at two locations on the ground that are far apart, there is a difference between the amounts of delay included in the positioning signals received at the two locations. However, in "a position locating process" (described below with reference to FIG. 5) that locates the relative position information, since it is assumed that the trailer 200 and the marine vessel 100 receive the positioning signal in a state where they are located close to each other, they receive substantially the same signal. Therefore, information on the amount of delay due to the ionosphere 301, the troposphere 302, etc. is canceled. As a result, as compared with a configuration in which the coordinates of the marine vessel 100 are located by a single GNSS receiving unit provided on the marine vessel 100, it is possible to accurately locate the relative position between the trailer 200 and the marine vessel 100 according to a preferred embodiment of the present invention. In order to distinguish the positioning signals received by the first GNSS receiving unit G1, the second GNSS receiving unit G2, and the third GNSS receiving unit G3, hereinafter, the positioning signal received by the first GNSS receiving unit G1 is referred to as a positioning signal S200, and on the other hand, not only the positioning signal received by the second GNSS receiving unit G2 is referred to as a positioning signal S100, but also the positioning signal received by the third GNSS receiving unit G3 is referred to as a positioning signal S100.

"The position locating process" is carried out by the following procedure. First, the driver of the vehicle 99 moves the trailer 200 to the inclined portion R and makes it stand still. Next, a marine vessel operator moves the marine vessel 100 to a position close to the trailer 200, and maneuvers the marine vessel 100 so that the trailer 200 is substantially located in the front of the marine vessel 100 (the +YB direction).

Figure 5:
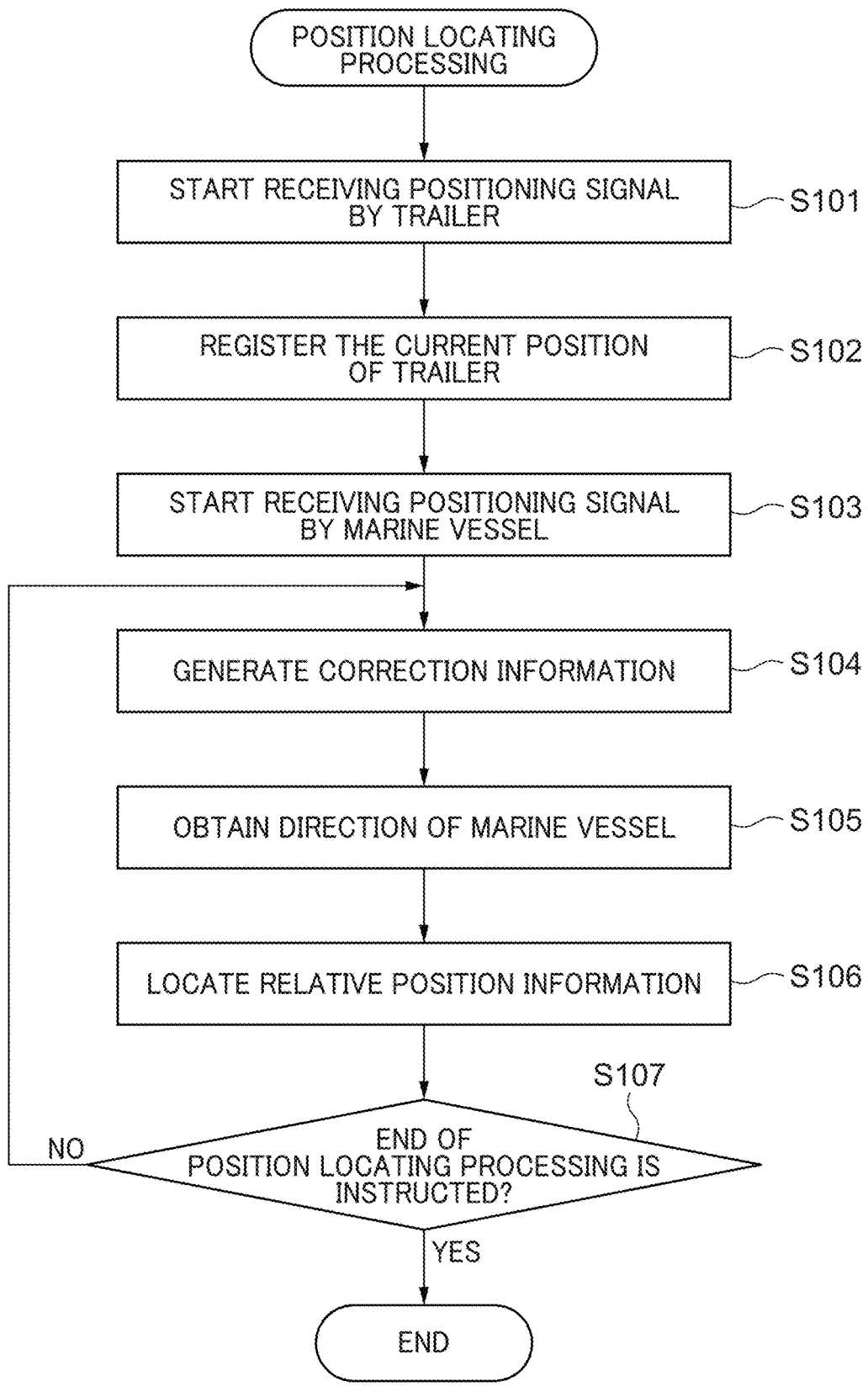
FIG. 5 is a flowchart that shows a position locating process.

FIG. 5 is a flowchart that shows the position locating process. The position locating process is realized by the CPU 102 expanding the program, which is stored in the ROM 103, on the RAM 104 and executing it. When the marine vessel operator instructs the control unit 101 to start the position locating process via the setting operation unit 117, the position locating process is started.

First, in step S101, the CPU 102 starts communications with the communication I/F 202 of the trailer 200 through the communication I/F 106. In the position locating process shown in FIG. 5, although a communication method between the CPU 102 and the first GNSS receiving unit G1 does not matter, as an example, the communication between the CPU 102 and the first GNSS receiving unit G1 is performed through the communication I/F 106 and the communication I/F 202. The CPU 102 starts receiving the positioning signal S200 by the first GNSS receiving unit G1 located on the trailer 200.

In step S102, the CPU 102, which functions as a registering unit, registers the current position of the trailer 200 based on the positioning signal S200 received by the first GNSS receiving unit G1 in a state that the trailer 200 is stationary. For example, a stationary period of the trailer 200 is set to several minutes or more. The CPU 102 sets a value, which is obtained by averaging position information calculated based on the positioning signal S200 received during the stationary period, as a regular current position of the trailer 200. The regular current position, which is set, is registered in the RAM 104. The registered current position is information corresponding to an installation position in the case of a fixed reference station in the RTK positioning method.

In step S103, the CPU 102 starts receiving the positioning signal S100 by the second GNSS receiving unit G2 and the third GNSS receiving unit G3 which are located on the marine vessel 100. The second GNSS receiving unit G2 and the third GNSS receiving unit G3 receive the positioning signal S100 at a time coincident to receiving the positioning signal S200 by the first GNSS receiving unit G1.

In step S104, the CPU 102, which functions as a generating unit, generates correction information in real time based on the registered current position and the positioning signal S200 received by the first GNSS receiving unit G1. The correction information includes information on a deviation between the registered current position, and the position (an instantaneous value) of the trailer 200 which is calculated in real time based on the positioning signal S200. That is, the correction information includes the information on the amount of delay due to the ionosphere 301 and the troposphere 302. The correction information changes in real time.

In step S105, the CPU 102, which functions as a direction obtaining unit, obtains the absolute marine vessel direction D100 of the marine vessel 100 from the direction sensor 119.

In step S106, the CPU 102 locates the relative position information based on the absolute marine vessel direction D100, the correction information, and the positioning signal S100 received by the second GNSS receiving unit G2. The positioning signal S100 used in step S106 is a signal received at a time coincident to receiving the positioning signal S200 used to calculate the correction information in step S104.

Specifically, the absolute coordinates of the marine vessel 100 on the ground are determined based on the correction information and the positioning signal S100. On the other hand, since the registered current position is known, the absolute coordinates of the trailer 200 on the ground are also determined. Therefore, since the relative position between the trailer 200 and the marine vessel 100 is also determined, it is possible to determine the distance L. In particular, since the correction information is used, the accuracy of determining the absolute coordinates of the marine vessel 100 is high. In addition, since the absolute marine vessel direction D100 is obtained, it is also possible to determine the relative trailer direction θ.

In step S107, the CPU 102 judges whether or not the end of the position locating process is instructed via the setting operation unit 117. In the case that the end of the position locating process is not instructed (NO in the step S107), the CPU 102 returns the process to step S104. Therefore, the latest relative position information is obtained in real time until the end of the position locating process is instructed. The located relative position information is sequentially displayed on the display unit 110. On the other hand, when the end of the position locating process is instructed (YES in the step S107), the CPU 102 ends the position locating process shown in FIG. 5. The finally-located relative position information is stored in a non-volatile storage medium such as the memory 111.

According to a preferred embodiment of the present invention, the trailer 200 is regarded as a reference station in the RTK positioning method, and the position of the marine vessel 100 is located. That is, the CPU 102 registers the current position of the trailer 200 based on the positioning signal S200 received by the first GNSS receiving unit G1 in the state that the trailer 200 is stationary. The CPU 102 generates the correction information in real time based on the current position, and the positioning signal S200 which is received by the first GNSS receiving unit G1. The CPU 102 locates the relative position information based on the absolute marine vessel direction D100, the correction information, and the positioning signal S100, which is received by the second GNSS receiving unit G2 at the time coincident to receiving the positioning signal S200 used to calculate the correction information. As a result, since an error caused by the amount of delay due to the ionosphere 301, the troposphere 302, etc. is canceled, it is possible to determine the relative trailer direction θ and the distance L as the relative position information between the marine vessel 100 and the trailer 200 with high accuracy. It should be noted that it is not essential to obtain the absolute marine vessel direction D100 as long as the distance L is determined.

Moreover, in the position locating process shown in FIG. 5, since the absolute marine vessel direction D100 is obtained from the direction sensor 119, it is not essential that the third GNSS receiving unit G3 is provided or that the third GNSS receiving unit G3 receives the positioning signal S100. On the contrary, the direction sensor 119 may be omitted by obtaining the absolute marine vessel direction D100 by using the positioning signal S100 received by the third GNSS receiving unit G3.

For example, the CPU 102 obtains the absolute marine vessel direction D100 based on the positioning signals S100, which are received by the second GNSS receiving unit G2 and the third GNSS receiving unit G3 at times coincident to each other. That is, since the coordinates of the second GNSS receiving unit G2 and the coordinates of the third GNSS receiving unit G3 are determined, respectively, it is possible to obtain the absolute marine vessel direction D100 based on these coordinates and the known positional relationship with each other. By doing so, the direction sensor 119 becomes unnecessary, and at the same time the second GNSS receiving unit G2 is able to be used not only in determining the relative position information but also in obtaining the absolute marine vessel direction D100, and as a result, it is possible to significantly reduce the complexity of the configuration.

From a viewpoint of obtaining a highly-accurate absolute marine vessel direction D100 by using the second GNSS receiving unit G2 and the third GNSS receiving unit G3, it is preferable that the second GNSS receiving unit G2 and the third GNSS receiving unit G3 are located at positions different from each other and as far apart as possible. In this viewpoint, since the second GNSS receiving unit G2 and the third GNSS receiving unit G3 are located on the bow and the stern of the marine vessel 100, a distance between them is made as large as possible so as to enhance the accuracy of the absolute marine vessel direction D100.

Further, from a viewpoint of increasing the distance, the second GNSS receiving unit G2 and the third GNSS receiving unit G3 may be located separately at a left side and a right side of the marine vessel 100.

Hereinafter, modification examples of preferred embodiments of the present invention will be described.

First, a first modification example will be described. FIG. 6 is a schematic view of a position locating system according to the first modification example. As shown in FIG. 6, the first object, on which the first GNSS receiving unit G1 is mounted, may be a moving vehicle 199 instead of the trailer 200. In addition, the second GNSS receiving unit G2 and the third GNSS receiving unit G3 are located at the right side and the left side of the marine vessel 100, respectively. Furthermore, the position locating process shown in FIG. 5 is executed in a state that the moving vehicle 199 is stationary on a pier 303. In the case of using such a configuration, it becomes easy to control marine vessel maneuvering such as stopping the marine vessel 100 near the pier 303 based on the relative position information that is obtained.

Alternatively, the first GNSS receiving unit G1 may be provided on one marine vessel, and the second GNSS receiving unit G2 and the third GNSS receiving unit G3 may be provided on the other marine vessel. By periodically updating the registration of the current position of one marine vessel and determining the relative position information in real time, it becomes easy for one marine vessel to track the other marine vessel.

Figure 7:
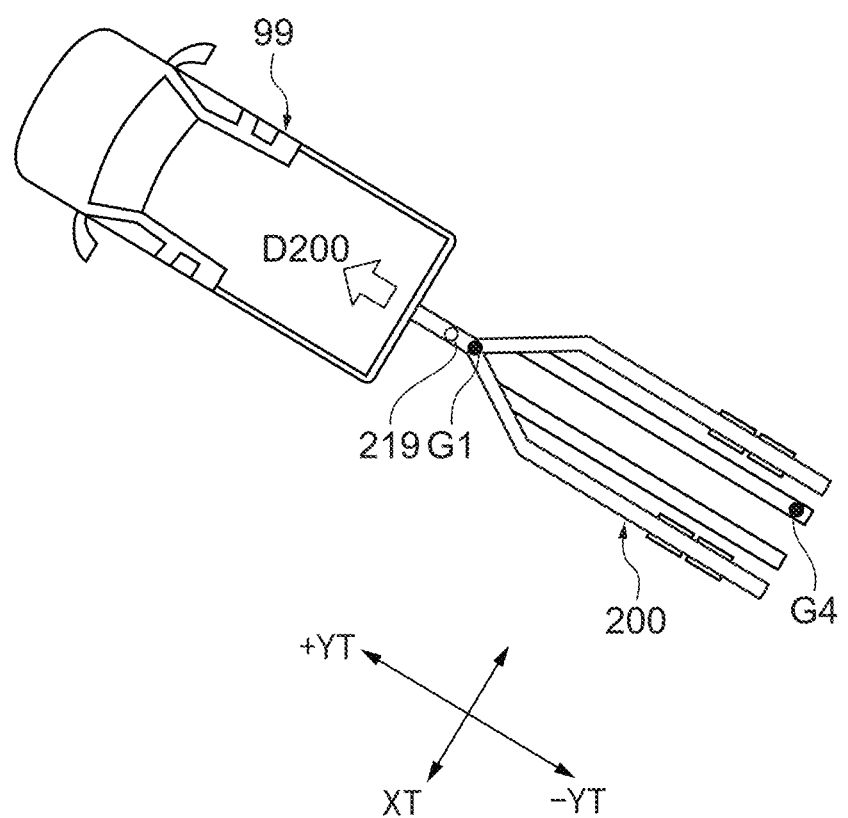
FIG. 7 is a schematic view of a portion of a position locating system according to a second modification example.

Next, a second modification example will be described. FIG. 7 is a schematic view of a portion of a position locating system according to the second modification example. As shown in FIG. 7, a direction sensor 219 having the same configuration as the direction sensor 119 may be provided on the trailer 200. Further, the CPU 102, which functions as "a second direction obtaining unit", may obtain the absolute trailer direction D200 of the trailer 200 from the direction sensor 219. The CPU 102 locates the relative marine vessel direction φ based on the above-described relative position information and the absolute trailer direction D200. That is, in the case that the CPU 102 obtains the absolute trailer direction D200 after the absolute coordinates of the trailer 200 and the marine vessel 100 are determined, it is also possible to determine the relative marine vessel direction φ as the relative position information. When the relative marine vessel direction φ is also determined, trailing will become easier.

Further, as shown in FIG. 7, in the trailer 200, a fourth GNSS receiving unit G4 may be located at a position different from that of the first GNSS receiving unit G1. The positional relationship between the first GNSS receiving unit G1 and the fourth GNSS receiving unit G4 is known. By providing the fourth GNSS receiving unit G4, it is possible to obtain the absolute trailer direction D200 without providing the direction sensor 219. For example, the CPU 102 obtains the absolute trailer direction D200 based on the positioning signals S200, which are received by the first GNSS receiving unit G1 and the fourth GNSS receiving unit G4 at times coincident to each other. As a result, the third GNSS receiving unit G3 is able to be used not only in obtaining the relative position information but also in obtaining the absolute trailer direction D200, and it is possible to significantly reduce the complexity of the configuration.

From a viewpoint of enhancing the accuracy of the absolute trailer direction D200, it is advantageous that a distance between the first GNSS receiving unit G1 and the fourth GNSS receiving unit G4 is large. Moreover, since there is a possibility that the fourth GNSS receiving unit G4 will be submerged due to an inclination of the trailer 200, a pole or the like may be provided on the trailer 200, and the fourth GNSS receiving unit G4 may be fixed to an upper end of the pole.

In a preferred embodiment of the present invention, the configuration that the control unit 101 of the marine vessel 100 performs the function of the position locating process which determines the relative position information is used. However, the present invention is not limited to this configuration, and the function of the position locating process may be provided on the trailer 200 or in an external communication device such as a smartphone. Similarly, respective functions of the registering unit that registers the current position of the trailer 200, the direction obtaining unit that obtains the absolute marine vessel direction D100, and the generating unit that generates the correction information may be provided on the trailer 200 or in the external communication device. Therefore, the trailer 200 or the marine vessel 100 may include at least one of the registering unit, the direction obtaining unit, the generating unit, or the position locator of the position locating system.

Further, in a preferred embodiment of the present invention, although the first GNSS receiving unit G1 is provided on the trailer 200, and the second GNSS receiving unit G2 and the third GNSS receiving unit G3 are provided on the marine vessel 100, the arrangement positions of the first GNSS receiving unit G1, and the second GNSS receiving unit G2 and the third GNSS receiving unit G3 may be reversed. In other words, such a configuration may be used in which the first GNSS receiving unit G1 is located on the first object that is one of the marine vessel 100 and the trailer 200, and the second GNSS receiving unit G2 and the third GNSS receiving unit G3 are located on the second object that is the other of the marine vessel 100 and the trailer 200.

Although the present invention has been described in detail based on the preferred embodiments described above, the present invention is not limited to the specific preferred embodiments, and various preferred embodiments within the scope not deviating from the gist of the present invention are also included in the present invention. Some of the above-described preferred embodiments and modification examples may be combined as appropriate.

It should be noted that preferred embodiments of the present invention are not limited to be applied to jet boats, and the present invention is also able to be applied to various kinds of marine vessels that are propelled by outboard motors, inboard motors, or inboard/outboard motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A position locating system comprising:
a first GNSS receiver located on a first object that is one of a marine vessel and a trailer for the marine vessel and configured or programmed to receive a positioning signal from a positioning satellite;
a second GNSS receiver located on a second object that is the other of the marine vessel and the trailer and configured or programmed to receive the positioning signal from the positioning satellite;
a controller configured or programmed to function as:
a registering unit to register a current position of the first object based on the positioning signal received from the positioning satellite by the first GNSS receiver in a state that the first object is stationary;
a direction obtaining unit to obtain a direction of the second object; and
a generating unit to generate correction information in real time based on the current position registered by the registering unit and the positioning signal received from the positioning satellite by the first GNSS receiver; and
a position locator configured or programmed to determine relative position information between the marine vessel and the trailer based on the direction of the second object obtained by the direction obtaining unit, the correction information generated by the generating unit, and the positioning signal received from the positioning satellite by the second GNSS receiver at a time coincident to receiving the positioning signal by the first GNSS receiver; wherein
the position locator is configured or programmed to determine a distance between the marine vessel and the trailer based on the correction information generated by the generating unit, and the positioning signal received from the positioning satellite by the second GNSS receiver at the time coincident to receiving the positioning signal by the first GNSS receiver.

2. The position locating system according to claim 1, wherein
the first object is the trailer and the second object is the marine vessel;
a third GNSS receiver configured or programmed to receive the positioning signal from the positioning satellite is located at a position on the marine vessel different from that of the second GNSS receiver; and
the direction obtaining unit is configured or programmed to obtain a direction of the marine vessel based on the positioning signal received from the positioning satellite by the second GNSS receiver and the positioning signal received from the positioning satellite by the third GNSS receiver.

3. The position locating system according to claim 2, wherein one of the second GNSS receiver and the third GNSS receiver is located on a bow of the marine vessel, and the other of the second GNSS receiver and the third GNSS receiver is located on a stern of the marine vessel.

4. The position locating system according to claim 2, wherein one of the second GNSS receiver and the third GNSS receiver is located on a left side of the marine vessel, and the other of the second GNSS receiver and the third GNSS receiver is located on a right side of the marine vessel.

5. The position locating system according to claim 1, wherein the direction obtaining unit is configured or programmed to obtain the direction of the second object from a direction sensor.

6. The position locating system according to claim 1, further comprising:
a second direction obtaining unit to obtain a direction of the first object; wherein
the position locator is configured or programmed to determine an orientation of the second object as viewed from the first object based on the relative position information, and the direction of the first object obtained by the second direction obtaining unit.

7. The position locating system according to claim 1, wherein the position locator is configured or programmed to determine the relative position information by using a Real Time Kinematic positioning method.

8. A marine vessel that is the first object or the second object in the position locating system according to claim 1, the marine vessel comprising:
at least one of the registering unit, the direction obtaining unit, the generating unit, or the position locator of the position locating system.

9. A trailer for a marine vessel that is the first object or the second object in the position locating system according to claim 1, the trailer comprising:
at least one of the registering unit, the direction obtaining unit, the generating unit, or the position locator of the position locating system.

10. A position locating system comprising:
a first GNSS receiver located on a first object that is one of a marine vessel and a trailer for the marine vessel and configured or programmed to receive a positioning signal from a positioning satellite;
a second GNSS receiver located on a second object that is the other of the marine vessel and the trailer and configured or programmed to receive the positioning signal from the positioning satellite;
a controller configured or programmed to function as:
a registering unit to register a current position of the first object based on the positioning signal received from the positioning satellite by the first GNSS receiver in a state that the first object is stationary;
a direction obtaining unit to obtain a direction of the second object; and
a generating unit to generate correction information in real time based on the current position registered by the registering unit and the positioning signal received from the positioning satellite by the first GNSS receiver; and
a position locator configured or programmed to determine relative position information between the marine vessel and the trailer based on the direction of the second object obtained by the direction obtaining unit, the correction information generated by the generating unit, and the positioning signal received from the positioning satellite by the second GNSS receiver at a time coincident to receiving the positioning signal by the first GNSS receiver; wherein
the position locator is configured or programmed to determine an orientation of the first object as viewed from the second object based on the direction of the second object obtained by the direction obtaining unit, the correction information generated by the generating unit, and the positioning signal received from the positioning satellite by the second GNSS receiver at the time coincident to receiving the positioning signal by the first GNSS receiver.

11. A position locating system comprising:
a first GNSS receiver located on a first object that is one of a marine vessel and a trailer for the marine vessel and configured or programmed to receive a positioning signal from a positioning satellite;

a second GNSS receiver located on a second object that is the other of the marine vessel and the trailer and configured or programmed to receive the positioning signal from the positioning satellite;

a controller configured or programmed to function as:
  a registering unit to register a current position of the first object based on the positioning signal received from the positioning satellite by the first GNSS receiver in a state that the first object is stationary;
  a direction obtaining unit to obtain a direction of the second object; and
  a generating unit to generate correction information in real time based on the current position registered by the registering unit and the positioning signal received from the positioning satellite by the first GNSS receiver;

a position locator configured or programmed to determine relative position information between the marine vessel and the trailer based on the direction of the second object obtained by the direction obtaining unit, the correction information generated by the generating unit, and the positioning signal received from the positioning satellite by the second GNSS receiver at a time coincident to receiving the positioning signal by the first GNSS receiver; and a second direction obtaining unit to obtain a direction of the first object; wherein the first object is the trailer and the second object is the marine vessel;

a fourth GNSS receiver configured or programmed to receive the positioning signal from the positioning satellite is located at a position on the trailer different from that of the first GNSS receiver; and the second direction obtaining unit is configured or programmed to obtain a direction of the trailer based on the positioning signal received from the positioning satellite by the first GNSS receiver and the positioning signal received from the positioning satellite by the fourth GNSS receiver.

* * * * *